United States Patent
Honda et al.

(10) Patent No.: US 9,766,000 B2
(45) Date of Patent: Sep. 19, 2017

(54) FLOW SWITCHING DEVICE AND AIR-CONDITIONING APPARATUS INCLUDING THE SAME

(75) Inventors: Takayoshi Honda, Tokyo (JP);
Daisuke Shimamoto, Tokyo (JP);
Osamu Morimoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 335 days.

(21) Appl. No.: 14/367,142

(22) PCT Filed: Mar. 9, 2012

(86) PCT No.: PCT/JP2012/001652
§ 371 (c)(1),
(2), (4) Date: Jun. 19, 2014

(87) PCT Pub. No.: WO2013/132543
PCT Pub. Date: Sep. 12, 2013

(65) Prior Publication Data
US 2015/0000325 A1    Jan. 1, 2015

(51) Int. Cl.
*F25B 41/04* (2006.01)
*F25B 30/02* (2006.01)
(Continued)

(52) U.S. Cl.
CPC .......... *F25B 41/046* (2013.01); *F16K 5/0414* (2013.01); *F16K 11/085* (2013.01);
(Continued)

(58) Field of Classification Search
CPC ............ F25B 25/005; F25B 2313/0231; F25B 2313/02743; F16K 11/085; F16K 11/0856;
(Continued)

(56) References Cited

U.S. PATENT DOCUMENTS 871,956 A * 11/1907 Rice .................. F16K 5/166
137/625.47
4,398,562 A * 8/1983 Saarem ................ F16K 31/041
126/585

(Continued)

FOREIGN PATENT DOCUMENTS

| CN | 201954043 U | 8/2011 |
|----|-------------|--------|
| EP | 2314939 A1 | 4/2011 |

(Continued)

OTHER PUBLICATIONS

Operating instructions Angle Seat Control Valve Type 7020, Schubert and Salzer Control Systems, Feb. 2006.*

(Continued)

*Primary Examiner* — Christopher R Zerphey
(74) *Attorney, Agent, or Firm* — Posz Law Group, PLC

(57) ABSTRACT

A valve body in each of heat medium flow switching devices has an open portion. When the length from a connection between a first passage pipe and a third passage pipe to a connection between a second passage pipe and the third passage pipe is defined as a casing passage width, a valve body passage width of the open portion in a direction substantially perpendicular to the axis of the valve body is smaller than the casing passage width.

6 Claims, 10 Drawing Sheets

(51) Int. Cl.

| | | |
|---|---|---|
| *F16K 11/085* | (2006.01) | |
| *F16K 31/04* | (2006.01) | |
| *F16K 5/04* | (2006.01) | |
| *F16K 31/42* | (2006.01) | |
| *F25B 13/00* | (2006.01) | |
| *F25B 25/00* | (2006.01) | |

(52) U.S. Cl.
CPC ........ *F16K 11/0856* (2013.01); *F16K 31/041* (2013.01); *F16K 31/423* (2013.01); *F25B 13/00* (2013.01); *F25B 25/005* (2013.01); *F25B 30/02* (2013.01); *F25B 41/04* (2013.01); *F25B 2313/003* (2013.01); *F25B 2313/006* (2013.01); *F25B 2313/023* (2013.01); *F25B 2313/0231* (2013.01); *F25B 2313/0233* (2013.01); *F25B 2313/02732* (2013.01); *F25B 2313/02743* (2013.01); *F25B 2313/02791* (2013.01); *Y10T 137/86533* (2015.04)

(58) Field of Classification Search
CPC ...... F16K 11/10; F16K 5/0414; F16K 31/426; F16K 31/423; F16K 31/041; F16K 31/0603
See application file for complete search history.

(56) References Cited

U.S. PATENT DOCUMENTS

| | | | | | |
|---|---|---|---|---|---|
| 4,819,877 | A | * | 4/1989 | Ciccolallo | A01G 25/162 137/883 |
| 5,226,454 | A | * | 7/1993 | Cabalfin | F16K 31/045 137/870 |
| 6,119,719 | A | * | 9/2000 | Viegener | F16K 5/0414 137/454.5 |
| 6,520,481 | B2 | * | 2/2003 | Harneit | F16K 5/103 137/599.17 |
| 9,212,825 | B2 | * | 12/2015 | Wakamoto | F24F 3/06 |
| 2004/0163720 | A1 | * | 8/2004 | Joung | F16K 11/076 137/625.47 |
| 2006/0214017 | A1 | * | 9/2006 | Vacca | B60H 1/00485 236/34.5 |
| 2011/0146339 | A1 | * | 6/2011 | Yamashita | F24F 3/06 62/513 |

FOREIGN PATENT DOCUMENTS

| | | | | |
|---|---|---|---|---|
| EP | 2420764 A1 | | 2/2012 | |
| JP | 50-29538 U | | 4/1975 | |
| JP | 50029538 | * | 4/1975 | ............. F16K 11/08 |
| JP | 63-86482 U | | 6/1988 | |
| JP | 05-49027 U | | 6/1993 | |
| JP | 05-280818 A | | 10/1993 | |
| JP | 08-243560 A | | 9/1996 | |
| JP | 2001-289465 A | | 10/2001 | |
| JP | 2003-343936 A | | 12/2003 | |
| JP | 2004-027855 A | | 1/2004 | |
| JP | 2005-140444 A | | 6/2005 | |
| JP | WO2009/133644 | * | 5/2009 | ............... F25B 1/00 |
| JP | WO2011/048646 | * | 4/2011 | ............. F25B 29/00 |
| WO | 2009/133644 A1 | | 11/2009 | |
| WO | 2011/048646 A1 | | 4/2011 | |

OTHER PUBLICATIONS

Office Action dated Aug. 3, 2015 issued in the corresponding CN patent application No. 201280069096.6 (and English translation).
Extended European Search Report issued Feb. 18, 2016 in the corresponding EP application No. 12870921.9.
International Search Report of the International Searching Authority mailed Apr. 17, 2012 for the corresponding international application No. PCT/JP2012/001652 (and English translation).
Office Action mailed Jun. 16, 2015 in the corresponding JP application No. 2014-503290 (English translation attached).

* cited by examiner (a)

(b)

(a)

(b)

FLOW SWITCHING DEVICE AND AIR-CONDITIONING APPARATUS INCLUDING THE SAME

CROSS REFERENCE TO RELATED APPLICATION

This application is a U.S. national stage application of PCT/JP2012/001652 filed on Mar. 9, 2012, the contents of which are incorporated herein by reference.

TECHNICAL FIELD

The present invention relates to a flow switching device and an air-conditioning apparatus including the same.

BACKGROUND

Some air-conditioning apparatuses, such as multi-air-conditioning apparatuses intended for office buildings, each include a heat source device (an outdoor unit) provided outside the building, and indoor units provided inside the building. A refrigerant that circulates through a refrigerant circuit of such an air-conditioning apparatus transfers its heat to (or receives heat from) air supplied to heat exchangers included in the indoor units, whereby the air is heated or cooled. The heated or cooled air is fed into air-conditioned spaces, whereby the air-conditioned spaces are heated or cooled.

A typical heat-source-side refrigerant to be used in such an air-conditioning apparatus is, for example, a HFC (hydrofluorocarbon)-based refrigerant. A natural refrigerant such as carbon dioxide ($CO_2$) is another alternative proposed as the heat-source-side refrigerant.

There is another air-conditioning apparatus, typically, a chiller system, having a different configuration. In such an air-conditioning apparatus, cooling or heating is performed as follows. Cooling energy or heating energy is generated by a heat source device provided outdoor. Subsequently, a heat medium, such as water or antifreeze, is heated or cooled by a heat exchanger included in an outdoor unit. Then, the heated or cooled heat medium is transported to indoor units, such as fan coil units or panel heaters, provided in air-conditioned spaces (see, for example, Patent Literature 1).

Furthermore, there is a heat-source-side heat exchanger called a heat recovery chiller in which a heat source device and each of indoor units are connected to each other by four water pipes, and water or the like that has been cooled and water or the like that has been heated are both supplied to the indoor units, so that cooling or heating is arbitrarily selectable on each of the indoor units (see, for example, Patent Literature 2).

There is yet another air-conditioning apparatus in which a heat exchanger for a primary refrigerant and a secondary refrigerant is provided near each of indoor units, and the secondary refrigerant is transported to the indoor units (see, for example, Patent Literature 3).

There is yet another air-conditioning apparatus in which an outdoor unit and a branch unit that includes a heat exchanger are connected to each other by two pipes, and a secondary refrigerant is transported to indoor units (see, for example, Patent Literature 4).

There is yet another air-conditioning apparatus in which a relay unit including a heat exchanger for a primary refrigerant and a secondary refrigerant is interposed between an outdoor unit and indoor units, and a predetermined heat medium is transported in separate portions to indoor units, respectively (see, for example, Patent Literature 5).

PATENT LITERATURE

Patent Literature 1: Japanese Unexamined Patent Application Publication No. 2005-140444 (page 4 and FIG. 1, for example)

Patent Literature 2: Japanese Unexamined Patent Application Publication No. 5-280818 (pages 4 and 5, and FIG. 1, for example)

Patent Literature 3: Japanese Unexamined Patent Application Publication No. 2001-289465 (pages 5 to 8 and FIGS. 1 and 2, for example)

Patent Literature 4: Japanese Unexamined Patent Application Publication No. 2003-343936 (page 5 and FIG. 1, for example)

Patent Literature 5: WO 2009/133644 (page 5, for example)

In an air-conditioning apparatus such as a known multi-air-conditioning apparatus intended for office buildings, a refrigerant is made to circulate through to indoor units. Hence, there is a possibility that the refrigerant may leak in rooms and other expected places. On the other hand, in the technique disclosed in Patent Literature 1, the refrigerant does not flow through the indoor units. Hence, leakage of the refrigerant in rooms is prevented.

In the technique disclosed in Patent Literature 1, however, the heat medium is heated or cooled by the heat source device provided outside the building and is transported to the indoor units. That is, the heat source device and the indoor units are connected by heat medium pipes. Therefore, the length of the circuit increases correspondingly. To transport energy for performing predetermined heating or cooling, the heat medium consumes a larger amount of energy as a transporting power and so forth than the heat-source-side refrigerant. That is, in the technique disclosed in Patent Literature 1, the transporting power is very high because the length of the heat medium circuit is long.

In the technique disclosed in Patent Literature 2, a plurality of indoor units are provided, and the outdoor side and the indoor side are connected to each other by four pipes so that the operation is selectable between cooling and heating on each of the indoor units. In the technique disclosed in Patent Literature 4, the branch unit and each of extension pipes are connected by a total of four pipes: two pipes for cooling and two pipes for heating. Such a configuration is consequently similar to a system in which the outdoor unit and the branch unit are connected to each other by four pipes. That is, in the techniques disclosed in Patent Literatures 2 and 4, since the outdoor side and the indoor side need to be connected to each other by four pipes, the ease of construction work is low.

In the technique disclosed in Patent Literature 4, the primary refrigerant obtained after heat exchange and the primary refrigerant obtained before heat exchange flow into the same passage. Therefore, if a plurality of indoor units are provided, the capacity of each of the indoor units cannot be maximized, wasting energy.

In the technique disclosed in Patent Literature 3, a pump for transporting the heat medium is provided for each of the indoor units. Therefore, the technique disclosed in Patent Literature 3 provides an expensive system correspondingly to the number of pumps. Moreover, noise generated by the pumps is large, making the system impractical.

In addition, since the heat exchanger in which the refrigerant flows is provided near each of the indoor units, the refrigerant may leak in or near rooms.

In the technique disclosed in Patent Literature 5, heat medium flow switching devices for switching the operation mode are provided. However, even a combination of two heat medium flow switching devices does not have a function of closing the passage. Therefore, to switch or close the passage and to thus implement a required operation mode, heat medium flow control devices for adjusting the flow rate of the heat medium needs to be provided separately from the heat medium flow switching devices, resulting in an increase in the number of components.

SUMMARY

The present invention has been made to solve at least one of the above problems and has as its object to provide a flow switching device including a reduced number of components and an air-conditioning apparatus including the same.

An air-conditioning apparatus according to the present invention includes a refrigerant circuit that includes a compressor, a first refrigerant flow switching device, a plurality of intermediate heat exchangers, a first expansion device, and a heat-source-side heat exchanger and forms a refrigeration cycle with a heat-source-side refrigerant circulating therethrough; and a heat medium circuit that includes the plurality of intermediate heat exchangers, a pump, and a plurality of use-side heat exchangers through which a heat medium circulates. The heat-source-side refrigerant and the heat medium exchange heat with each other in each of the intermediate heat exchangers. The air-conditioning apparatus comprises first heat medium flow switching devices that are provided in the heat medium circuit and switch a passage of the heat medium supplied from the plurality of intermediate heat exchangers to the respective use-side heat exchangers, and second heat medium flow switching devices that are provided in the heat medium circuit and switch a passage of the heat medium returning from the respective use-side heat exchangers to the plurality of intermediate heat exchangers. The first heat medium flow switching devices and the second heat medium flow switching devices each include a first passage pipe providing a connection port to one of the plurality of intermediate heat exchangers, a second passage pipe providing a connection port to another of the plurality of intermediate heat exchangers, a third passage pipe interposed between the first passage pipe and the second passage pipe and providing a connection port to a corresponding one of the use-side heat exchangers, and a valve body provided in the third passage pipe in such a manner as to be rotatable about an axis extending in a direction in which the heat medium flows through the third passage pipe, the valve body having an open portion that allows the first passage pipe and the third passage pipe or the second passage pipe and the third passage pipe to communicate with each other when the valve body rotates. When the length from a connection between the first passage pipe and the third passage pipe to a connection between the second passage pipe and the third passage pipe is defined as a casing passage width, the opening width of the open portion of the valve body in a direction substantially perpendicular to the axis of the valve body is smaller than the casing passage width.

In the air-conditioning apparatus according to the present invention, when the length from the connection between the first passage pipe and the third passage pipe to the connection between the second passage pipe and the third passage pipe is defined as a casing passage width, the opening width of the open portion of the valve body in a direction substantially perpendicular to the axis of the valve body is smaller than the casing passage width. Therefore, the flow rate is adjustable even without providing a heat medium flow control device in the pipe that connects each of the first heat medium flow switching devices and a corresponding one of the second heat medium flow switching devices to a corresponding one of the use-side heat exchangers. Hence, the number of components can be reduced.

DETAILED DESCRIPTION

Embodiment of the present invention will now be described with reference to the accompanying drawings.

Figure 1:
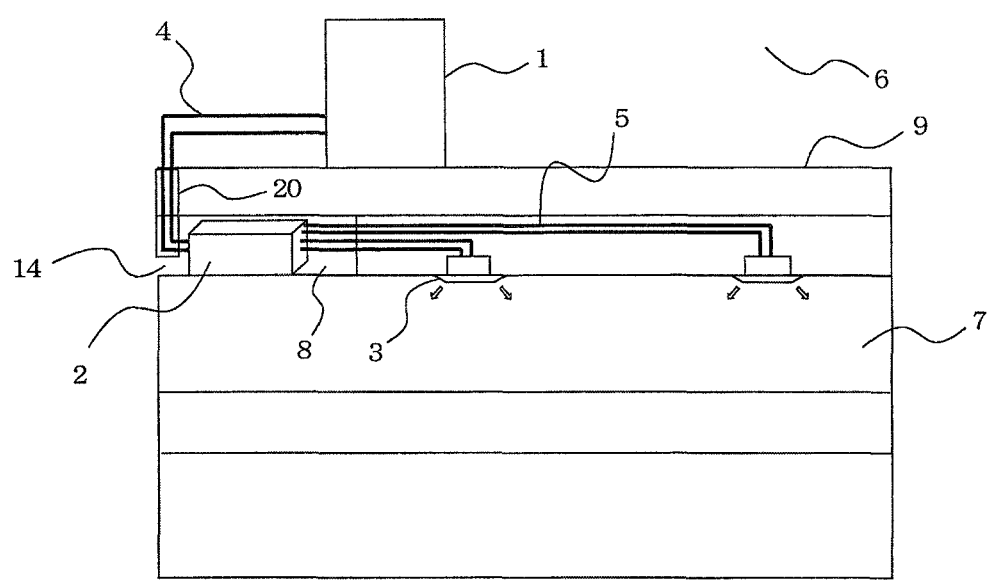
FIG. 1 is a schematic diagram illustrating an exemplary installation of an air-conditioning apparatus according to Embodiment of the present invention.

FIG. 1 is a schematic diagram illustrating an exemplary installation of an air-conditioning apparatus according to Embodiment of the present invention. The exemplary installation of the air-conditioning apparatus will be described with reference to FIG. 1. The air-conditioning apparatus includes a refrigeration cycle (including a refrigerant circuit A and a heat medium circuit B) that allows refrigerants (a heat-source-side refrigerant and a heat medium) to circulate therethrough. Thus, the operation mode is arbitrarily selectable between a cooling mode and a heating mode on each indoor unit. Note that elements illustrated in the drawings, including FIG. 1, to be referred to below are not necessarily scaled in accordance with their actual sizes.

Referring to FIG. 1, the air-conditioning apparatus according to Embodiment includes one outdoor unit 1 as a heat source device, a plurality of indoor units 3, and a relay unit 2 interposed between the outdoor unit 1 and the indoor units 3. The relay unit 2 allows the heat-source-side refrigerant and the heat medium to exchange heat with each other. The outdoor unit 1 and the relay unit 2 are connected to each other by refrigerant pipes 4 in which the heat-source-side refrigerant flows. The relay unit 2 and the indoor units 3 are connected to each other by pipes (heat medium pipes) 5 in which the heat medium flows. Cooling energy or heating energy generated by the outdoor unit 1 is delivered to the indoor units 3 via the relay unit 2.

The outdoor unit 1 is provided typically in an outdoor space 6, which is a space outside a building 9 such as an office building (for example, on the rooftop). The outdoor unit 1 supplies cooling energy or heating energy to the indoor units 3 via the relay unit 2. The indoor units 3 are provided at positions where cooling air or heating air can be supplied into indoor spaces 7, which are spaces inside the building 9 (for example, rooms). The indoor units 3 supply the cooling air or the heating air to the indoor spaces 7, which correspond to air-conditioned spaces. The relay unit 2 is configured to be installable at a position separate from the outdoor space 6 and the indoor spaces 7 (for example, any space such as a common space or a space above a ceiling of the building 9; to be simply referred to as a space 8 hereinafter). The relay unit 2 is connected to the outdoor unit 1 and to the indoor units 3 by the refrigerant pipes 4 and by the heat medium pipes 5, respectively. Thus, the relay unit 2 transfers the cooling energy or the heating energy supplied thereto from the outdoor unit 1 to the indoor units 3.

As illustrated in FIG. 1, in the air-conditioning apparatus according to Embodiment, the outdoor unit 1 and the relay unit 2 are connected to each other by two refrigerant pipes 4, and the relay unit 2 and each of the indoor units 3 are connected to each other by two heat medium pipes 5. Since the foregoing units (the outdoor unit 1, the indoor units 3, and the relay unit 2) included in the air-conditioning apparatus according to Embodiment are thus connected by two kinds of pipes (the refrigerant pipes 4 and the heat medium pipes 5), the air-conditioning apparatus is easy to construct.

Operations of the air-conditioning apparatus according to Embodiment will now be described briefly.

The heat-source-side refrigerant is transported from the outdoor unit 1 to the relay unit 2 through the refrigerant pipes 4. The heat-source-side refrigerant thus transported to the relay unit 2 exchanges heat with the heat medium in intermediate heat exchangers (to be described below) included in the relay unit 2, thereby giving its heating energy or cooling energy to the heat medium. The heating energy or cooling energy stored in the heat medium in the relay unit 2 is transported to the indoor units 3 through the heat medium pipes 5 by pumps (to be described below). The heat medium thus transported to the indoor units 3 is used for a heating operation or a cooling operation performed on the indoor spaces 7.

FIG. 1 illustrates an exemplary state where the relay unit 2 is a body that is separate from the outdoor unit 1 and the indoor units 3 and is provided in the space 8 that is inside the building 9 but is separate from the indoor spaces 7. The relay unit 2 can alternatively be provided in a common space where elevators or the like are provided or another similar space. While FIG. 1 illustrates an exemplary case where the indoor units 3 are of a ceiling-cassette type, the present invention is not limited to such a case. The indoor units 3 may be of a ceiling-concealed type, ceiling-suspended type, or any other type as long as the indoor units 3 can blow the heating air or the cooling air into the indoor spaces 7 directly or through ducts or the like.

While FIG. 1 illustrates an exemplary case where the outdoor unit 1 is provided in the outdoor space 6, the present invention is not limited to such a case. For example, the outdoor unit 1 may be provided in an enclosed space, such as a machine room having vent holes. If waste heat can be exhausted to the outside of the building 9 via an exhaust duct, the outdoor unit 1 may be provided inside the building 9. Alternatively, if the outdoor unit 1 is of a water-cooled type, the outdoor unit 1 may be provided inside the building 9. No special problems are expected to arise even if the outdoor unit 1 is provided in such a place.

The relay unit 2 can be provided near the outdoor unit 1. However, it should be noted that if the distance from the relay unit 2 to the indoor units 3 is too long, the energy saving effect is reduced because the power of transporting the heat medium becomes very high. The numbers of outdoor units 1, indoor units 3, and relay units 2 are not limited to those illustrated in FIG. 1 and may be determined in accordance with the building 9 in which the air-conditioning apparatus according to Embodiment is to be installed.

A plurality of relay units 2 are connectable to one outdoor unit 1. If a plurality of relay units 2 are provided dispersedly in the space 8, the heating energy or the cooling energy can be transferred among heat-source-side heat exchangers included in the respective relay units 2. In such a configuration, indoor units 3 are installable at distances or heights that fall within an allowable range of transport by pumps included in the respective relay units 2, whereby the indoor units 3 can be provided to operate in the building 9 as a whole.

Examples of the heat-source-side refrigerant include single-component refrigerants such as R-22 and R-134a, pseudo-azeotropic refrigerant mixtures such as R-410A and R-404A, zeotropic refrigerant mixtures such as R-407C, refrigerants such as $CF_3$ and $CF=CH_2$ containing double bonds in their chemical formulae and having relatively small global warming potentials, mixtures of such refrigerants, and natural refrigerants such as $CO_2$ and propane. In an intermediate heat exchanger 25a or an intermediate heat exchanger 25b that is under operation for heating, a typical refrigerant that undergoes two-phase transition is condensed and liquefied, whereas a refrigerant such as $CO_2$ that can reach a supercritical state is cooled while being in a supercritical state. The two kinds of refrigerants behave in the same manner in the other respects and produce the same effects.

Examples of the heat medium include brine (an antifreeze), water, a mixture of brine and water, a mixture of water and a highly anticorrosive additive, and the like. Hence, in the air-conditioning apparatus according to Embodiment, since a highly safe heat medium is employed, improved safety is provided even if the heat medium leaks in the indoor spaces 7 from any of the indoor units 3.

Figure 2:
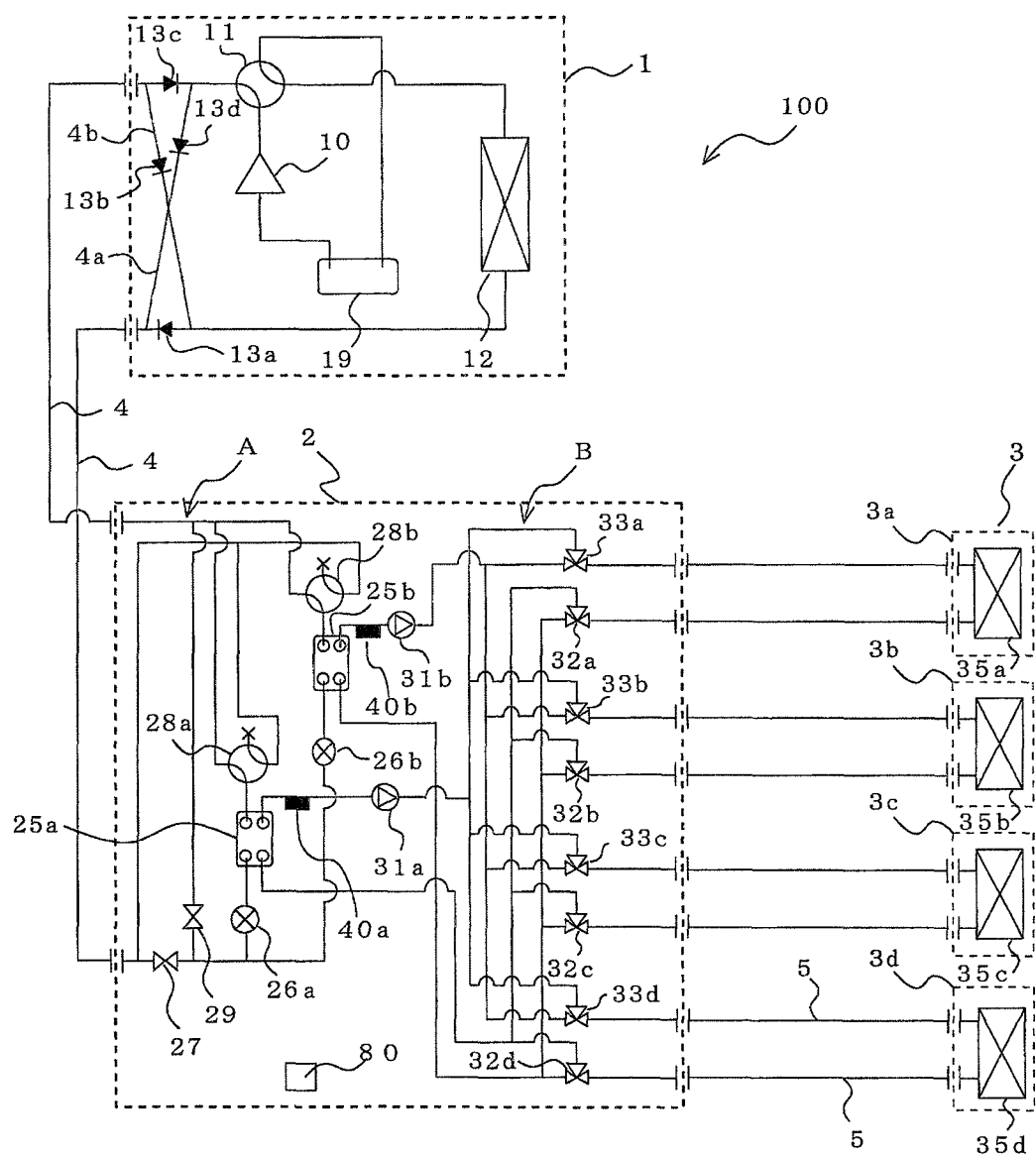
FIG. 2 is a schematic circuit diagram illustrating an exemplary circuit configuration of the air-conditioning apparatus according to Embodiment of the present invention.

FIG. 2 is a schematic circuit diagram illustrating an exemplary circuit configuration of the air-conditioning apparatus (to be referred to as an air-conditioning apparatus 100 hereinafter) according to Embodiment. Details of the circuit configuration of the air-conditioning apparatus 100 will now be described with reference to FIG. 2. As illustrated in FIG. 2, the outdoor unit 1 and the relay unit 2 are connected to each other by the refrigerant pipes 4 via the intermediate heat exchanger 25a and the intermediate heat exchanger 25b that are included in the relay unit 2. The relay unit 2 and the indoor units 3 are connected to each other by the heat medium pipes 5 via the intermediate heat exchanger 25a and the intermediate heat exchanger 25b. The refrigerant pipes 4 will be described in detail separately below.

[Outdoor Unit 1]

The outdoor unit 1 includes a compressor 10, a first refrigerant flow switching device 11 such as a four-way valve, a heat-source-side heat exchanger 12, and an accumulator 19 that are housed in a housing and are connected in series by the refrigerant pipes 4. The outdoor unit 1 further includes a first connection pipe 4a, a second connection pipe 4b, a check valve 13a, a check valve 13d, a check valve 13b, and a check valve 13c. With the first connection pipe 4a, the second connection pipe 4b, the check valve 13a, the check valve 13d, the check valve 13b, and the check valve 13c, the heat-source-side refrigerant that flows into the relay unit 2 can be guided in a specific direction regardless of the operations required by the indoor units 3.

The compressor 10 sucks the heat-source-side refrigerant, compresses the heat-source-side refrigerant into a high-temperature, high-pressure refrigerant, and transports the refrigerant to the refrigerant circuit A. The compressor 10 is desirably, for example, an inverter compressor whose capacity is controllable. The first refrigerant flow switching device 11 switches the flow of the heat-source-side refrigerant between that in a heating operation mode (including a heating only operation mode and a heating main operation mode) and that in a cooling operation mode (including a cooling only operation mode and a cooling main operation mode).

The heat-source-side heat exchanger 12 serves as an evaporator in the heating operation and as a condenser (or a radiator) in the cooling operation. The heat-source-side heat exchanger 12 allows air supplied from an air-sending device (not illustrated) such as a fan and the heat-source-side refrigerant to exchange heat with each other, whereby the heat-source-side heat exchanger 12 evaporates and gasifies or condenses and liquefies the heat-source-side refrigerant. The accumulator 19 is provided on the suction side of the compressor 10 and stores excess refrigerant resulting from the difference between the heating operation and the cooling operation or excess refrigerant resulting from transient changes in the operation.

The check valve 13a is provided in one of the refrigerant pipes 4 that extends between the heat-source-side heat exchanger 12 and the relay unit 2, and allows the heat-source-side refrigerant to flow only in a predetermined direction (the direction from the outdoor unit 1 toward the relay unit 2). The check valve 13c is provided in the other refrigerant pipe 4 that extends between the relay unit 2 and the first refrigerant flow switching device 11, and allows the heat-source-side refrigerant to flow only in a predetermined direction (the direction from the relay unit 2 toward the outdoor unit 1). The check valve 13d is provided in the first connection pipe 4a and allows the heat-source-side refrigerant discharged from the compressor 10 to flow into the relay unit 2 in the heating operation. The check valve 13b is provided in the second connection pipe 4b and allows the heat-source-side refrigerant having returned from the relay unit 2 to flow toward the suction side of the compressor 10 via the heat-source-side heat exchanger 12 in the heating operation.

The first connection pipe 4a included in the outdoor unit 1 connects a portion of the refrigerant pipe 4 that extends between the first refrigerant flow switching device 11 and the check valve 13c and a portion of the refrigerant pipe 4 that extends between the check valve 13a and the relay unit 2. The second connection pipe 4b included in the outdoor unit 1 connects a portion of the refrigerant pipe 4 that extends between the check valve 13c and the relay unit 2 and a portion of the refrigerant pipe 4 that extends between the heat-source-side heat exchanger 12 and the check valve 13a. While FIG. 2 illustrates an exemplary case where the first connection pipe 4a, the second connection pipe 4b, the check valve 13a, the check valve 13d, the check valve 13b, and the check valve 13c are provided, the present invention is not limited to such a case. The foregoing elements need not necessarily be provided.

[Indoor Unit 3]

Each indoor unit 3 includes a use-side heat exchanger 35 housed in a housing. The use-side heat exchanger 35 allows air supplied from an air-sending device (not illustrated) such as a fan and the heat medium to exchange heat with each other, thereby generating heating air or cooling air to be supplied to a corresponding one of the indoor spaces 7.

FIG. 2 illustrates an exemplary case where four indoor units 3 are connected to the relay unit 2. The four indoor units 3 include an indoor unit 3a, an indoor unit 3b, an indoor unit 3c, and an indoor unit 3d illustrated in that order from the upper side of the page. The use-side heat exchangers 35 include, in correspondence with the indoor units 3a to 3d, a use-side heat exchanger 35a, a use-side heat exchanger 35b, a use-side heat exchanger 35c, and a use-side heat exchanger 35d illustrated in that order from the upper side of the page. As in the case illustrated in FIG. 1, the number of indoor units 3 is not limited to four as illustrated in FIG. 2.

[Relay Unit 2]

The relay unit 2 includes, in a housing, at least two intermediate heat exchangers (refrigerant-water heat exchangers) 25, two expansion devices 26, an opening/closing device 27, an opening/closing device 29, two second refrigerant flow switching devices 28, two pumps 31, four second heat medium flow switching devices 32, and four first heat medium flow switching devices 33.

The two intermediate heat exchangers 25 (the intermediate heat exchanger 25a and the intermediate heat exchanger 25b) each serve as a condenser (radiator) when supplying the heat medium to indoor units 3 performing the heating operation, or as an evaporator when supplying the heat medium to indoor units 3 performing the cooling operation. Each intermediate heat exchanger 25 allows the heat-source-side refrigerant and the heat medium to exchange heat with each other and transfers to the heat medium the cooling energy or the heating energy generated by the outdoor unit 1 and stored in the heat-source-side refrigerant.

The intermediate heat exchanger 25a is provided in the refrigerant circuit A and between an expansion device 26a and a second refrigerant flow switching device 28a. The intermediate heat exchanger 25a is intended for cooling of the heat medium in the cooling only operation mode and in a cooling and heating mixed operation mode, and for heating of the heat medium in the heating only operation mode. The intermediate heat exchanger 25b is provided in the refrigerant circuit A and between an expansion device 26b and a second refrigerant flow switching device 28b. The intermediate heat exchanger 25b is intended for heating of the heat medium in the heating only operation mode and in the cooling and heating mixed operation mode, and for cooling of the heat medium in the cooling only operation mode.

The two expansion devices 26 (the expansion device 26a and the expansion device 26b) each function as a pressure reducing valve or an expansion valve and expand the heat-source-side refrigerant by reducing the pressure of the heat-source-side refrigerant. The expansion device 26*a* is provided on the upstream side of the intermediate heat exchanger 25*a* in the direction in which the heat-source-side refrigerant flows in the cooling operation. The expansion device 26*b* is provided on the upstream side of the intermediate heat exchanger 25*b* in the direction in which the heat-source-side refrigerant flows in the cooling operation. The two expansion devices 26 may each be a device whose opening degree is variably controllable, for example, an electronic expansion valve.

The opening/closing device 27 and the opening/closing device 29 are each, for example, a solenoid valve that is openable and closable when energized. The opening/closing of each of the opening/closing device 27 and the opening/closing device 29 is controlled in accordance with the operation mode of the indoor units 3. The opening/closing device 27 and the opening/closing device 29 each switch the refrigerant passage in the refrigerant circuit A. The opening/closing device 27 is provided in one of the refrigerant pipes 4 that is on the inlet side for the heat-source-side refrigerant. The opening/closing device 29 is provided in a pipe (bypass pipe) connecting the refrigerant pipes 4 that are on the inlet side and the outlet side, respectively, for the heat-source-side refrigerant.

The two second refrigerant flow switching devices 28 (the second refrigerant flow switching device 28*a* and the second refrigerant flow switching device 28*b*) are each, for example, a four-way valve and each switch the flow of the heat-source-side refrigerant so that a corresponding one of the intermediate heat exchangers 25 can be used as a condenser or an evaporator in accordance with the operation mode of the indoor units 3. The second refrigerant flow switching device 28*a* is provided on the downstream side of the intermediate heat exchanger 25*a* in the direction in which the heat-source-side refrigerant flows in the cooling operation. The second refrigerant flow switching device 28*b* is provided on the downstream side of the intermediate heat exchanger 25*b* in the direction in which the heat-source-side refrigerant flows in the cooling only operation mode.

The two pumps 31 (a pump 31*a* and a pump 31*b*) each transport the heat medium flowing in the heat medium pipes 5 to the indoor units 3. The pump 31*a* is provided in one of the heat medium pipes 5 that extends between the intermediate heat exchanger 25*a* and the first heat medium flow switching devices 33. The pump 31*b* is provided in the other heat medium pipe 5 that extends between the intermediate heat exchanger 25*b* and the first heat medium flow switching devices 33. The two pumps 31 are each, for example, a pump whose capacity is controllable, so that the flow rate is adjustable in accordance with the loads on the indoor units 3.

The four second heat medium flow switching devices 32 (second heat medium flow switching devices 32*a* to 32*d*) are each a three-way valve or the like and each switch the passage of the heat medium. One of the three ways of each second heat medium flow switching device 32 is connected to the intermediate heat exchanger 25*a*, another is connected to the intermediate heat exchanger 25*b*, and the other is connected to a corresponding one of the use-side heat exchangers 35. The second heat medium flow switching device 32 is provided in one of the heat medium passages that is on the outlet side of the use-side heat exchanger 35. That is, each second heat medium flow switching device 32 switches the passage of the heat medium to flow into a corresponding one of the indoor units 3 between that connected to the intermediate heat exchanger 25*a* and that connected to the intermediate heat exchanger 25*b*.

The number (four in this case) of second heat medium flow switching devices 32 corresponds to the number of indoor units 3. In correspondence with the indoor units 3, the second heat medium flow switching device 32*a*, the second heat medium flow switching device 32*b*, the second heat medium flow switching device 32*c*, and the second heat medium flow switching device 32*d* are illustrated in that order from the upper side of the page.

A detailed configuration of each of the second heat medium flow switching devices 32 will be described separately below with reference to FIGS. 3 and 4.

The four first heat medium flow switching devices 33 (first heat medium flow switching devices 33*a* to 33*d*) are each a three-way valve or the like and each switch the passage of the heat medium. One of the three ways of each first heat medium flow switching device 33 is connected to the intermediate heat exchanger 25*a*, another is connected to the intermediate heat exchanger 25*b*, and the other is connected to a corresponding one of the use-side heat exchangers 35. The first heat medium flow switching device 33 is provided in the other heat medium passage that is on the inlet side of the use-side heat exchanger 35. That is, each first heat medium flow switching device 33 switches, in cooperation with a corresponding one of the second heat medium flow switching devices 32, the passage of the heat medium to flow into a corresponding one of the indoor units 3 between that connected to the intermediate heat exchanger 25*a* and that connected to the intermediate heat exchanger 25*b*.

The number (four in this case) of first heat medium flow switching devices 33 corresponds to the number of indoor units 3. In correspondence with the indoor units 3, the first heat medium flow switching device 33*a*, the first heat medium flow switching device 33*b*, the first heat medium flow switching device 33*c*, and the first heat medium flow switching device 33*d* are illustrated in that order from the upper side of the page.

A detailed configuration of each of the first heat medium flow switching devices 33 will be described separately below with reference to FIGS. 3 and 4.

The relay unit 2 includes two temperature sensors 40 (a temperature sensor 40*a* and a temperature sensor 40*b*). Information (temperature information) detected by the temperature sensors 40 is sent to a controller 80 that generally controls the operation of the air-conditioning apparatus 100, and is used for controlling the driving frequency of the compressor 10, the rotation speed of the air-sending device (not illustrated), the switching of the first refrigerant flow switching device 11, the driving frequencies of the pumps 31, the switching of the second refrigerant flow switching devices 28, the switching of the passage of the heat medium, the adjustment of the flow rates of the heat medium in the indoor units 3, and so forth.

The two temperature sensors 40 detect the temperatures of portions of the heat medium that have flowed out of the respective intermediate heat exchangers 25, that is, portions of the heat medium at the outlets of the respective intermediate heat exchangers 25. The temperature sensors 40 may each be a thermistor, for example. The temperature sensor 40*a* is provided in a portion of the heat medium pipe 5 that is on the inlet side of the pump 31*a*. The temperature sensor 40*b* is provided in a portion of the heat medium pipe 5 that is on the inlet side of the pump 31*b*.

The controller 80 includes a microprocessor or the like and, in accordance with the information detected by the temperature sensors 40 and instructions from remote controllers, controls the driving frequency of the compressor 10, the rotation speed (including an on/off operation) of the air-sending device, the switching of the first refrigerant flow switching device 11, the driving of the pumps 31, the opening degrees of the expansion devices 26, the opening/closing of the opening/closing device 27, the opening/closing of the opening/closing device 29, the switching of the second refrigerant flow switching devices 28, the switching of the second heat medium flow switching devices 32, and the switching of the first heat medium flow switching devices 33, and executes any of the operation modes to be described separately below. The controller 80 may be provided for each of the units and may be provided in the outdoor unit 1 or the relay unit 2.

The heat medium pipes 5 in which the heat medium flows include one connected to the intermediate heat exchanger 25a and one connected to the intermediate heat exchanger 25b. Each of the heat medium pipes 5 has a certain number (four in this case) of branches in correspondence with the number of indoor units 3 connected to the relay unit 2. The heat medium pipes 5 are connected to each other by the second heat medium flow switching devices 32 and the first heat medium flow switching devices 33. By controlling the second heat medium flow switching devices 32 and the first heat medium flow switching devices 33, whether to allow the heat medium from the intermediate heat exchanger 25a to flow into the use-side heat exchangers 35 or to allow the heat medium from the intermediate heat exchanger 25b to flow into the use-side heat exchangers 35 is determined.

In the air-conditioning apparatus 100, the compressor 10, the first refrigerant flow switching device 11, the heat-source-side heat exchanger 12, the opening/closing devices 27 and 29, the second refrigerant flow switching devices 28, the refrigerant passage provided in the intermediate heat exchanger 25, the expansion devices 26, and the accumulator 19 are connected to one another by the refrigerant pipes 4, whereby the refrigerant circuit A is formed. Also, the heat medium passage provided in the intermediate heat exchanger 25, the pumps 31, the second heat medium flow switching devices 32, the use-side heat exchangers 35, and the first heat medium flow switching devices 33 are connected to one another by the heat medium pipes 5, whereby the heat medium circuit B is formed. That is, the plurality of use-side heat exchangers 35 connected in parallel are connected to each of the intermediate heat exchangers 25, whereby the heat medium circuit B includes a plurality of lines.

Hence, in the air-conditioning apparatus 100, the outdoor unit 1 and the relay unit 2 are connected to each other via the intermediate heat exchanger 25a and the intermediate heat exchanger 25b that are included in the relay unit 2, and the relay unit 2 and the indoor units 3 are also connected to each other via the intermediate heat exchanger 25a and the intermediate heat exchanger 25b. That is, in the air-conditioning apparatus 100, the intermediate heat exchanger 25a and the intermediate heat exchanger 25b each allow the heat-source-side refrigerant circulating through the refrigerant circuit A and the heat medium circulating through the heat medium circuit B to exchange heat with each other. With such a system configuration, the air-conditioning apparatus 100 can implement a cooling operation or a heating operation optimum for the indoor loads.

[Second Heat Medium Flow Switching Device 32 and First Heat Medium Flow Switching Device 33]

Figure 3:
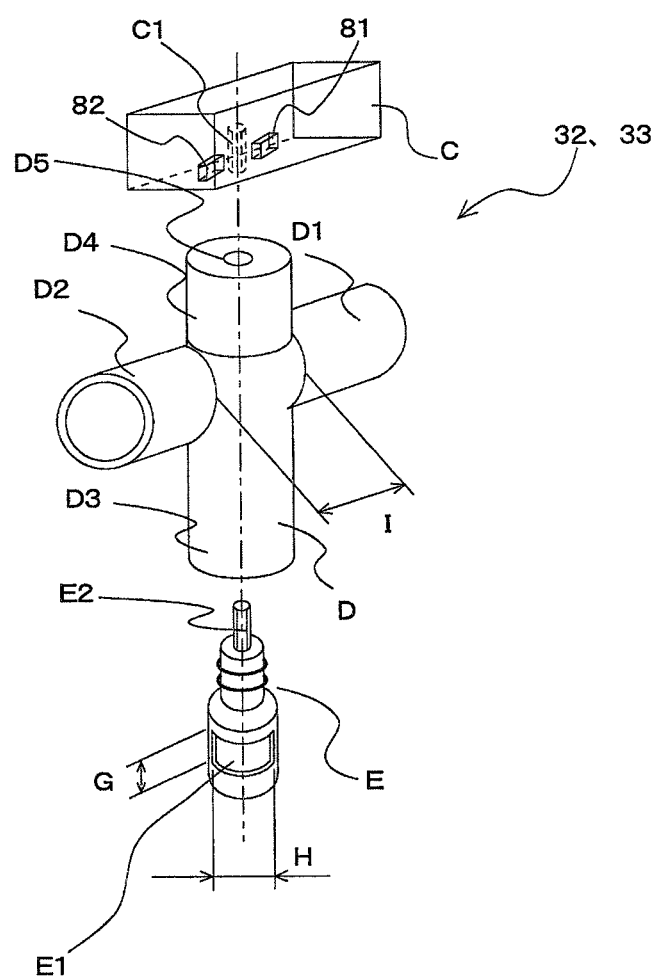
FIG. 3 is a diagram of a first heat medium flow switching device or a second heat medium flow switching device included in the air-conditioning apparatus according to Embodiment of the present invention.

FIG. 3 is a diagram of one of the second heat medium flow switching devices 32 or one of the first heat medium flow switching devices 33 included in the air-conditioning apparatus 100 according to Embodiment. An exemplary configuration of each of the second heat medium flow switching device 32 and the first heat medium flow switching device 33 will now be described with reference to FIG. 3.

As illustrated in FIG. 3, the second heat medium flow switching device 32 and the first heat medium flow switching device 33 each include a casing D in which the heat medium flows, a valve body E provided in the casing D and configured to change the passage provided in the casing D, and a gearbox C configured to rotate the valve body E in the casing D.

(Casing D)

The casing D houses the valve body E and provides passages of the heat medium supplied thereto. The casing D includes a first passage pipe D1, a second passage pipe D2, and a third passage pipe D3 in any of which the heat medium flows, and a valve body supporting portion D4 projecting upward from the third passage pipe D3.

The first passage pipe D1 is a substantially cylindrical member with one end thereof connected to the third passage pipe D3, and provides a connection port to one of the plurality of intermediate heat exchangers 25a and 25b.

The second passage pipe D2 is a substantially cylindrical member with one end thereof connected to the third passage pipe D3 in such a manner as to face the connection between the first passage pipe D1 and the third passage pipe D3. The second passage pipe D2 provides a connection port to one of the plurality of intermediate heat exchangers 25a and 25b that is not connected to the first passage pipe D1.

The third passage pipe D3 is a substantially cylindrical member and is connected to the one end of the first passage pipe D1 and to the one end of the second passage pipe D2. That is, the third passage pipe D3 is interposed between the first passage pipe D1 and the second passage pipe D2 and provides a connection port to a corresponding one of the use-side heat exchangers 35. The third passage pipe D3 allows the valve body E to be housed therein from an opening provided therein on the lower side of the page illustrating FIG. 3.

The valve body supporting portion D4 has an open portion D5 extending therethrough in the vertical direction of the page illustrating FIG. 3 and projects upward from the third passage pipe D3. A shaft portion E2 of the valve body E (to be described below) is insertable into the open portion D5 of the valve body supporting portion D4.

(Valve Body E)

The valve body E is capable of adjusting "whether to allow the first passage pipe D1 and the third passage pipe D3 to communicate with each other" and "whether to allow the second passage pipe D2 and the third passage pipe D3 to communicate with each other." More specifically, the valve body E is capable of adjusting the state thereof among the following three patterns.

(1) State 1

A state where the first passage pipe D1 and the third passage pipe D3 are allowed to communicate with each other while the second passage pipe D2 and the third passage pipe D3 are not allowed to communicate with each other (see FIG. 6(b)).

(2) State 2

A state where the second passage pipe D2 and the third passage pipe D3 are allowed to communicate with each other while the first passage pipe D1 and the third passage pipe D3 are not allowed to communicate with each other.

(3) State 3

A state where the first passage pipe D1 and the third passage pipe D3 are not allowed to communicate with each other, and the second passage pipe D2 and the third passage pipe D3 are not allowed to communicate with each other (see FIG. 5(b)).

The valve body E has an open portion E1 that allows the first passage pipe D1 and the third passage pipe D3 to communicate with each other or the second passage pipe D2 and the third passage pipe D3 to communicate with each other. Furthermore, the valve body E includes the shaft portion E2 provided at the top thereof and connected to the gearbox C through the open portion D5 of the valve body supporting portion D4. That is, since the shaft portion E2 of the valve body E is connected to the gearbox C, the valve body E is rotatable in the casing D. The shaft portion E2 extends substantially parallel to the direction in which the heat medium flows through the third passage pipe D3.

Regarding the dimensions of the casing D, the length from the connection between the first passage pipe D1 and the third passage pipe D3 to the connection between the second passage pipe D2 and the third passage pipe D3 is defined as a casing passage width I. Regarding the dimensions of the open portion E1 of the valve body E, the lateral length of the open portion E1 is defined as a valve body passage width H, and the vertical length of the open portion E1 is defined as a valve body passage length G.

The casing passage width I does not correspond to the length of an arc on the outer circumferential surface of the third passage pipe D3 but corresponds to the chord of the arc. The valve body passage width H is defined in a direction substantially perpendicular to the shaft portion E2. That is, the valve body passage width H corresponds to the linear distance from one of the lateral ends of the open portion E1 to the other, not the length of an arc on the outer circumferential surface of the valve body E but the chord of the arc.

The valve body passage width H of the open portion E1 is smaller than the casing passage width I. Thus, the valve body E is rotated in the casing D, whereby the valve body E is adjustable among States 1 to 3 described above. That is, since the valve body passage width H of the open portion E1 is not larger than the casing passage width I, the first passage pipe D1, the second passage pipe D2, and the third passage pipe D3 are prevented from communicating with one another simultaneously.

The casing D is restricted by the casing passage width I. Therefore, the valve body passage length G for ensuring a certain rate of the flow of the heat medium into the second heat medium flow switching device 32 and the first heat medium flow switching device 33 is determined uniquely. Hence, the shape of the valve body E is limited to some extent depending on the dimensions and the shape of the casing D.

In Embodiment, as illustrated in FIG. 3, the casing D has such a shape that the first passage pipe D1 and the second passage pipe D2 are connected to each other so as to extend along one straight line (the pipes D1 and D2 make 180 degrees with each other). If the first passage pipe D1 and the second passage pipe D2 are connected to the third passage pipe D3 to make, for example, 90 degrees with each other, a casing passage width I on a side where the first passage pipe D1 and the second passage pipe D2 make 90 degrees with each other is smaller than a casing passage width I on the opposite side (a side where the two pipes D1 and D2 make 270 degrees with each other). In such a case, it is desired to employ the smaller one of the casing passage widths I.

While Embodiment concerns a case where, as illustrated in FIG. 3, the open portion E1 has a rectangular shape when projected, the present invention is not limited to such a case. The open portion E1 only needs to have such a shape that the loss of pressure in the passage is reduced to a maximum extent when the valve body E is inserted into the casing D.

For example, the open portion E1 may have a circular shape or an oval shape when projected. If the open portion E1 has a circular shape, the diameter thereof corresponds to the valve body passage width H. If the open portion E1 has an elliptical shape, the distance from one of the lateral ends of the ellipse to the other corresponds to the valve body passage width H.

(Gearbox C)

The gearbox C rotates the valve body E in the casing D. The gearbox C includes a rotation driving portion C1 to which the shaft portion E2 of the valve body E is connected. The shaft portion E2 is connected to the rotation driving portion C1 of the gearbox C, whereby the rotation driving portion C1 is capable of rotating the valve body E via the shaft portion E2.

The rotation driving portion C1 includes, for example, a stepping motor. The gearbox C has a Hall IC 81 that detects the position of the valve body E, and so forth.

The gearbox C further includes a stopper 82 that limits the angular range of rotation of the valve body E so that the valve body E does not rotate beyond a predetermined angular range. For example, the angular range of rotation of the valve body E is defined from 0 degrees to 180 degrees. Accordingly, the stopper 82 is capable of limiting the operation of the valve body E so that the valve body E does not rotate through an angle of 180 degrees to 360 degrees.

If no air-conditioning loads are generated because the indoor units 3a to 3d are kept stopped or are in a thermo-off state, the controller 80 controls the gearbox C such that State (1) or State (2) is enabled. The controller 80 enables State (1) or State (2) as "fully open State (1)" or "fully open State (2)." Thus, if the indoor units 3a to 3d are kept stopped or are in the thermo-off state, the zero point of the valve body E is adjustable. Therefore, for example, any damage to the valve body E due to its collision with the stopper 82 can be prevented, and the opening degree of the valve body E can reliably be adjusted.

"Fully open State (1)" means "a state where the state of communication between the first passage pipe D1 and the third passage pipe D3 is maximized while the second passage pipe D2 and the third passage pipe D3 are not allowed to communicate with each other." "Fully open State (2)" means "a state where the state of communication between the second passage pipe D2 and the third passage pipe D3 is maximized while the first passage pipe D1 and the third passage pipe D3 are not allowed to communicate with each other."

[Modification of First Heat Medium Flow Switching Device 33 and Second Heat Medium Flow Switching Device 32]

Figure 4:
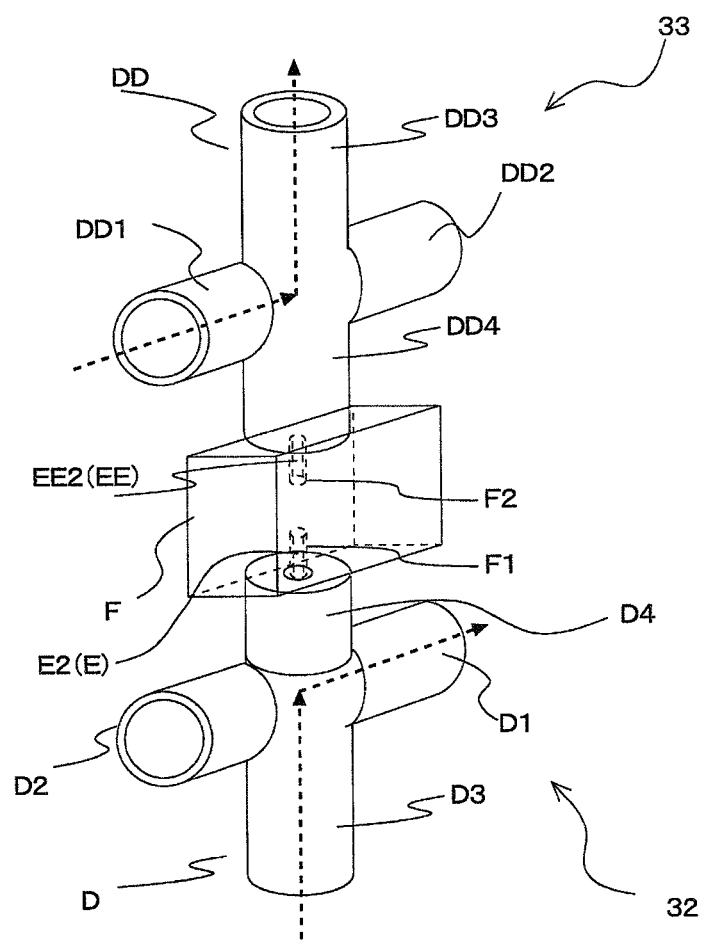
FIG. 4 is a diagram illustrating a case where the first heat medium flow switching device and the second heat medium flow switching device are adjusted by using one gearbox.
Figure 5:
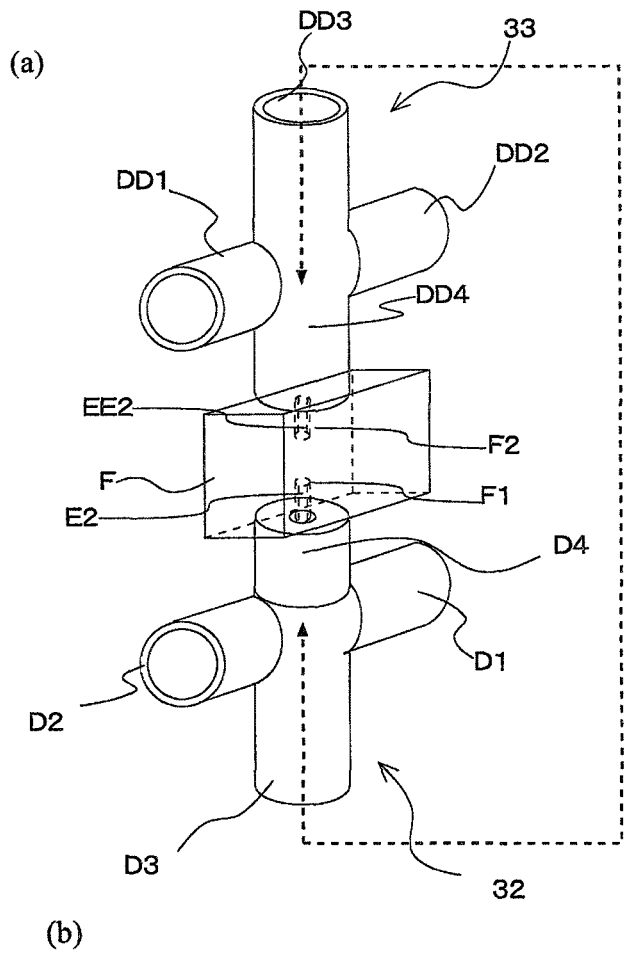
FIG. 5 is a diagram illustrating a state where passages of a heat medium provided in each of the first heat medium flow switching device and the second heat medium flow switching device illustrated in FIG. 4 are closed.
Figure 5:
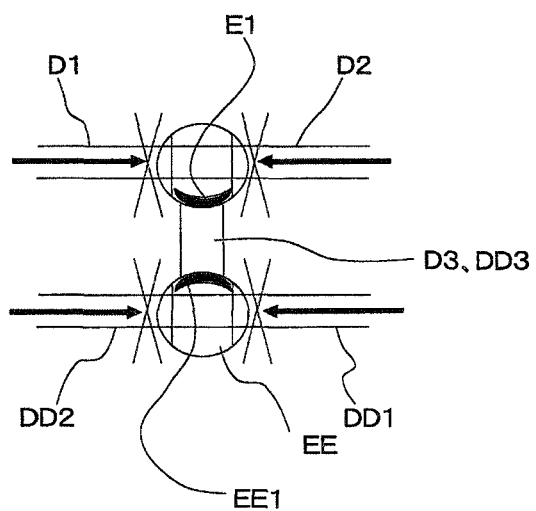
Figure 6:
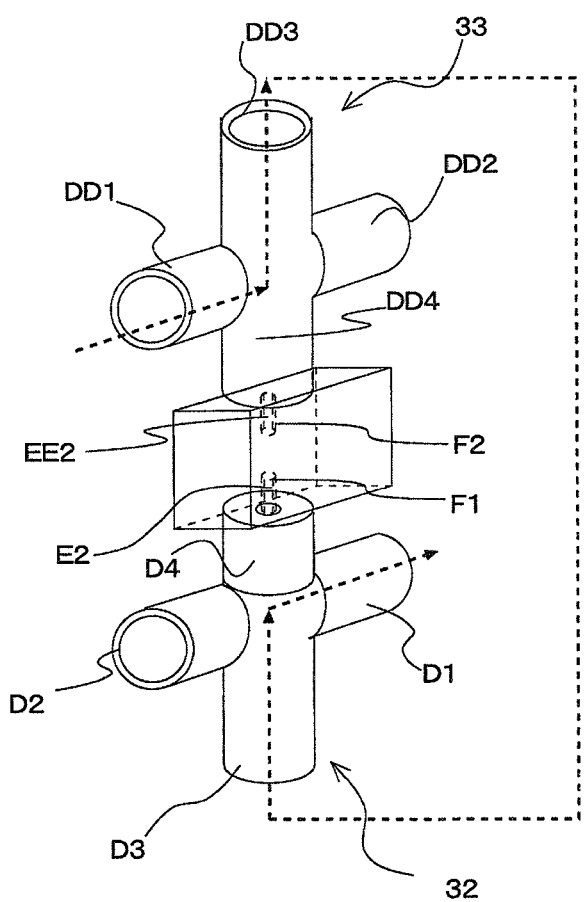
FIG. 6 is a diagram illustrating a state where one of the passages provided in each of the first heat medium flow switching device and the second heat medium flow switching device illustrated in FIG. 4 is closed while the other passage is open.
Figure 6:
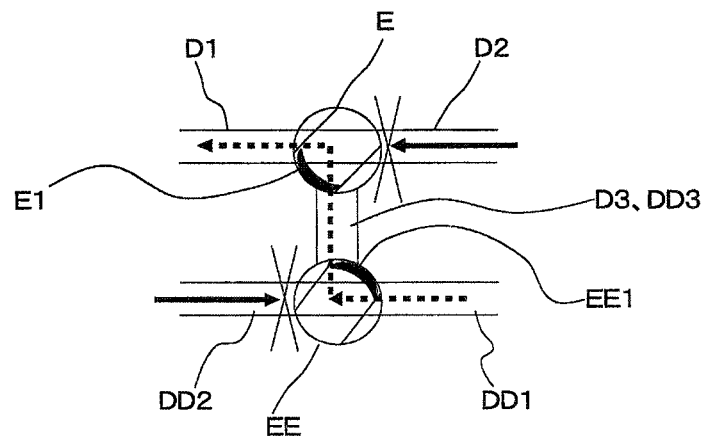

FIG. 4 is a diagram illustrating a case where the second heat medium flow switching device 32 and the first heat medium flow switching device 33 are adjusted by using one gearbox F. FIG. 5(a) is a diagram illustrating a state where the passages of the heat medium provided in each of the second heat medium flow switching device 32 and the first heat medium flow switching device 33 illustrated in FIG. 4 are closed. FIG. 5(b) is a schematic diagram illustrating the flow of the heat medium. FIG. 6(a) is a diagram illustrating a state where one of the passages provided in each of the second heat medium flow switching device 32 and the first heat medium flow switching device 33 illustrated in FIG. 4 is closed while the other passage is open. FIG. 6(b) is a schematic diagram illustrating the flow of the heat medium. In FIGS. 4 to 6, the Hall IC 81 and the stopper 82 illustrated in FIG. 3 are not illustrated.

A modification of the second heat medium flow switching device 32 and the first heat medium flow switching device 33 will now be described with reference to FIGS. 4 to 6.

As illustrated in FIG. 4, the gearbox F may include rotation driving portions F1 and F2 provided on the lower side and the upper side, respectively, of the page illustrating FIG. 4. That is, the opening degrees of the respective valve bodies E included in the first heat medium flow switching device 33a and the second heat medium flow switching device 32a are adjustable with one gearbox F. Likewise, the opening degrees of the valve bodies E are adjustable with one gearbox F for each of a pair of the first heat medium flow switching device 33b and the second heat medium flow switching device 32b, a pair of the first heat medium flow switching device 33c and the second heat medium flow switching device 32c, and a pair of the first heat medium flow switching device 33d and the second heat medium flow switching device 32d.

Thus, the rotations of two respective valve bodies are adjustable with one gearbox F. Moreover, gearboxes F equal in number to indoor units 3 can be omitted, attaining a cost reduction.

Referring to FIG. 4, a casing DD corresponds to the casing D illustrated in FIG. 3, a first passage pipe DD1 corresponds to the first passage pipe D1 illustrated in FIG. 3, a second passage pipe DD2 corresponds to the second passage pipe D2 illustrated in FIG. 3, a third passage pipe DD3 corresponds to the third passage pipe D3 illustrated in FIG. 3, and a valve body supporting portion DD4 corresponds to the valve body supporting portion D4 illustrated in FIG. 3.

Referring again to FIG. 4, a valve body EE corresponds to the valve body E illustrated in FIG. 3, an open portion EE1 corresponds to the open portion E1 illustrated in FIG. 3, and a shaft portion EE2 corresponds to the shaft portion E2 illustrated in FIG. 3. By providing the gearbox F in such a manner, States (1) to (3) described above are each enabled with one gearbox F, as illustrated in FIG. 5.

The connection between each of the first passage pipe D1 and other passage pipes and a corresponding one of the heat medium pipes 5 now will be described.

An exemplary case of the first heat medium flow switching device 33a will be described.

The first passage pipe D1 is connected to one of the heat medium pipes 5 that is on the side of the intermediate heat exchanger 25a or on the side of the intermediate heat exchanger 25b. The second passage pipe D2 is connected to another of the heat medium pipes 5 that is on the side of the other intermediate heat exchanger different from the one connected to the first passage pipe D1. The third passage pipe D3 is connected to the other of the heat medium pipes 5 that is on the heat-medium-inlet side of the use-side heat exchanger 35a.

The same applies to each of the first heat medium flow switching devices 33b to 33d. Specifically, the first passage pipe D1 is connected to one of the heat medium pipes 5 that is on the side of the intermediate heat exchanger 25a or on the side of the intermediate heat exchanger 25b. The second passage pipe D2 is connected to another of the heat medium pipes 5 that is on the side of the other intermediate heat exchanger different from the one connected to the first passage pipe D1. The third passage pipe D3 is connected to the other of the heat medium pipes 5 that is on the heat-medium-inlet side of a corresponding one of the use-side heat exchangers 35b to 35d.

The second heat medium flow switching device 32a will now be described.

The first passage pipe D1 is connected to one of the heat medium pipes 5 that is on the side of the intermediate heat exchanger 25a or on the side of the intermediate heat exchanger 25b. The second passage pipe D2 is connected to another of the heat medium pipes 5 that is on the side of the other intermediate heat exchanger different from the one connected to the first passage pipe D1. The third passage pipe D3 is connected to the other of the heat medium pipes 5 that is on the heat-medium-outlet side of the use-side heat exchanger 35a.

The same applies to each of the second heat medium flow switching devices 32b to 32d. Specifically, the first passage pipe D1 is connected to one of the heat medium pipes 5 that is on the side of the intermediate heat exchanger 25a or on the side of the intermediate heat exchanger 25b. The second passage pipe D2 is connected to another of the heat medium pipes 5 that is on the side of the other intermediate heat exchanger different from the one connected to the first passage pipe D1. The third passage pipe D3 is connected to the other of the heat medium pipes 5 that is on the heat-medium-outlet side of a corresponding one of the use-side heat exchangers 35b to 35d.

The flow of the heat medium illustrated in FIG. 5(b) and FIG. 6(b) will now be described.

In the state illustrated in FIG. 5(b), no air-conditioning load is generated by a corresponding one of the indoor units 3, and the first heat medium flow switching device 33 and the second heat medium flow switching device 32 are fully closed. This corresponds to the state of each of the first heat medium flow switching devices 33a and 33b and the second heat medium flow switching devices 32a and 32b illustrated in FIG. 7 to be described below.

In the state illustrated in FIG. 6(b), a certain air-conditioning load is generated by a corresponding one of the indoor units 3, and the first heat medium flow switching device 33 and the second heat medium flow switching device 32 are each in State (1) or State (2). Specifically, the first heat medium flow switching device 33c and the second heat medium flow switching device 32c illustrated in FIG. 7 to be described below are connected to the intermediate heat exchanger 25b, and the states thereof each correspond to State (1) or State (2).

Meanwhile, the first heat medium flow switching device 33d and the second heat medium flow switching device 32d are connected not to the intermediate heat exchanger 25b but to the intermediate heat exchanger 25a, and the states thereof are opposite to the states of the first heat medium flow switching device 33c and the second heat medium flow switching device 32c. That is, the first heat medium flow switching device 33d and the second heat medium flow switching device 32d are each in State (2) or State (1).

The air-conditioning apparatus 100 according to Embodiment has four operation modes for a cooling only operation, a cooling main operation, a heating only operation, and a heating main operation. That is, the air-conditioning apparatus 100 is configured to change the flow of the refrigerant circulating through the refrigerant circuit A and the flow of the heat medium circulating through the heat medium circuit B by switching the passages using the first refrigerant flow switching device 11, the second refrigerant flow switching devices 28a and 28b, the second heat medium flow switching devices 32, and the first heat medium flow switching devices 33. Thus, the air-conditioning apparatus 100 is capable of performing the same operation on all of the indoor units 3 and is also capable of performing different operations on different indoor units 3.

The "cooling only operation mode" refers to an operation mode in which all indoor units 3 in operation are performing the cooling operation. The "heating only operation mode" refers to an operation mode in which all indoor units 3 in operation are performing the heating operation. The "cooling main operation mode" refers to a cooling and heating mixed operation mode in which indoor units 3 performing the heating operation and indoor units 3 performing the cooling operation are present simultaneously, and the cooling load is higher than the heating load. The "heating main operation mode" refers to another cooling and heating mixed operation mode in which indoor units 3 performing the heating operation and indoor units 3 performing the cooling operation are present simultaneously, and the heating load is higher than the cooling load.

Actions involved in the cooling only operation, the cooling main operation, the heating only operation, and the heating main operation will now be described.

[Cooling Only Operation Mode]

Figure 7:
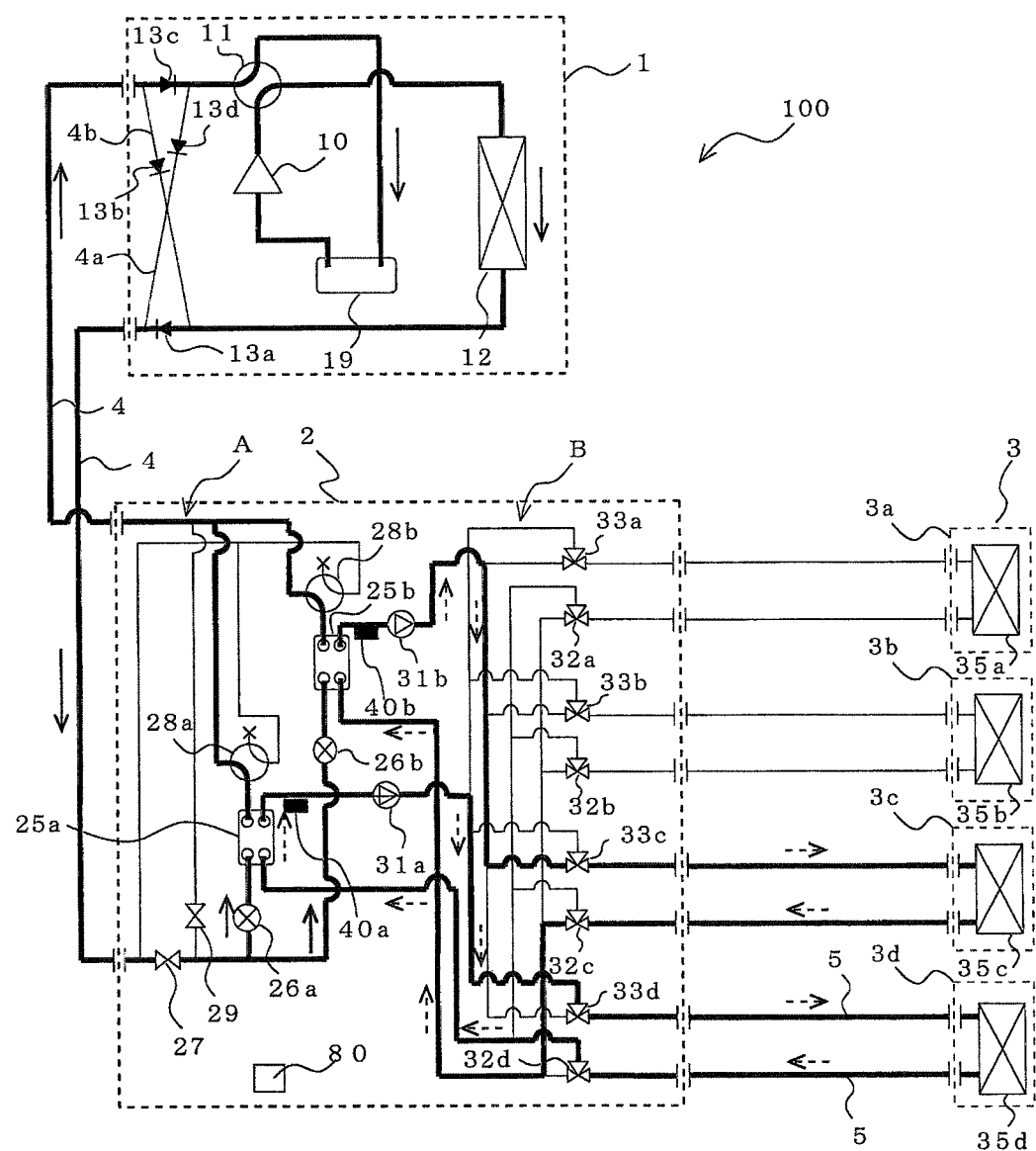
FIG. 7 is a refrigerant circuit diagram illustrating the flows of refrigerants when the air-conditioning apparatus illustrated in FIG. 2 is in a cooling only operation mode.

FIG. 7 is a refrigerant circuit diagram illustrating the flows of the refrigerants when the air-conditioning apparatus 100 illustrated in FIG. 2 is in the cooling only operation mode. An exemplary case of the cooling only operation mode will now be described with reference to FIG. 7, in which cooling energy loads are generated only by the use-side heat exchanger 35c and the use-side heat exchanger 35d. Referring to FIG. 7, pipes indicated by bold lines correspond to pipes in which the refrigerants (the heat-source-side refrigerant and the heat medium) flow. Referring again to FIG. 7, the direction in which the heat-source-side refrigerant flows is represented by solid arrows, and the direction in which the heat medium flows is represented by dashed arrows.

In the cooling only operation mode illustrated in FIG. 7, the following process is performed. In the outdoor unit 1 on the part of the refrigerant circuit A, the first refrigerant flow switching device 11 is switched such that the heat-source-side refrigerant discharged from the compressor 10 flows into the heat-source-side heat exchanger 12.

In the relay unit 2, the second refrigerant flow switching devices 28a and 28b are switched to a "cooling side," the opening/closing device 27 is opened, and the opening/closing device 29 is closed. Switching the second refrigerant flow switching devices 28a and 28b to the "cooling side" means switching the second refrigerant flow switching devices 28a and 28b such that the refrigerant flows from the side of the intermediate heat exchangers 25a and 25b toward the side of the second refrigerant flow switching devices 28a and 28b.

In the relay unit 2 on the part of the heat medium circuit B, the pump 31a and the pump 31b are activated, and the second heat medium flow switching devices 32a and 32b and the first heat medium flow switching devices 33a and 33b are fully closed (see FIG. 5). Meanwhile, the second heat medium flow switching devices 32c and 32d and the first heat medium flow switching devices 33c and 33d are each in State (1) or State (2) described above, whereby associated passages are opened. Hence, the heat medium circulates between the intermediate heat exchanger 25a and the use-side heat exchanger 35c and between the intermediate heat exchanger 25b and the use-side heat exchanger 35d.

While the above description concerns an exemplary case where the heat medium circulates "between the intermediate heat exchanger 25a and the use-side heat exchanger 35c," the passages of the first heat medium flow switching device 33c and the second heat medium flow switching device 32c may be adjusted such that the heat medium circulates "between the intermediate heat exchanger 25a and the use-side heat exchanger 35d."

Likewise, while the above description concerns an exemplary case where the heat medium circulates "between the intermediate heat exchanger 25b and the use-side heat exchanger 35d," the passages of the first heat medium flow switching device 33d and the second heat medium flow switching device 32d may be adjusted such that the heat medium circulates "between the intermediate heat exchanger 25b and the use-side heat exchanger 35c."

[Heating Only Operation Mode]

Figure 8:
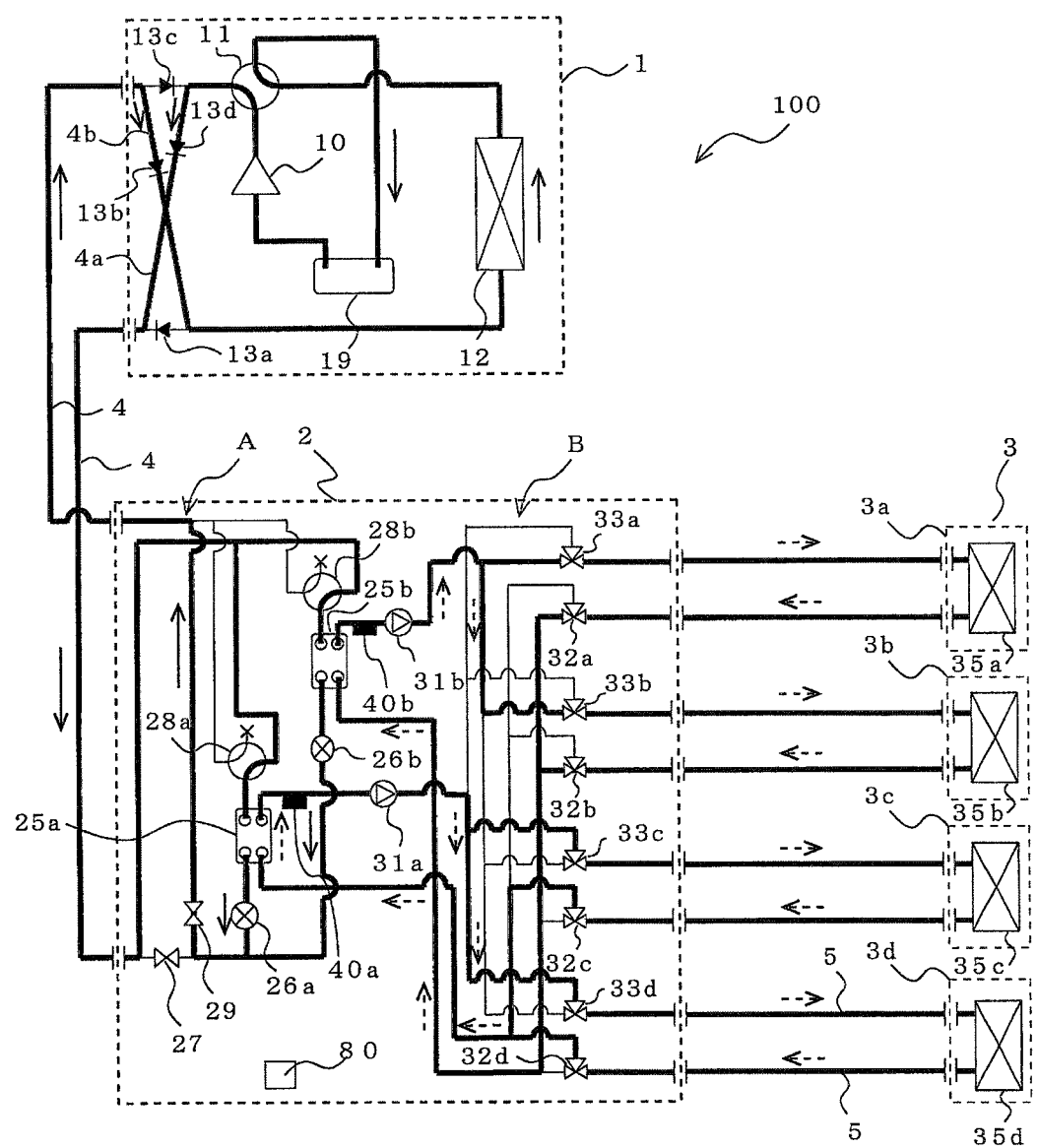
FIG. 8 is a refrigerant circuit diagram illustrating the flows of the refrigerants when the air-conditioning apparatus illustrated in FIG. 2 is in a heating only operation mode.

FIG. 8 is a refrigerant circuit diagram illustrating the flows of the refrigerants when the air-conditioning apparatus 100 illustrated in FIG. 2 is in the heating only operation mode. FIG. 8 illustrates an exemplary case where all of the indoor units 3 are activated. Referring to FIG. 8, refrigerant pipes 4 indicated by bold lines represent the flow of the heat-source-side refrigerant in the heating only operation mode. Referring again to FIG. 8, the direction in which the heat-source-side refrigerant flows is represented by solid arrows, and the direction in which the heat medium flows is represented by dashed arrows.

In the heating only operation mode illustrated in FIG. 8, the following process is performed. In the outdoor unit 1 on the part of the refrigerant circuit A, the first refrigerant flow switching device 11 is switched such that the heat-source-side refrigerant discharged from the compressor 10 flows out of the outdoor unit 1 via the check valve 13d.

In the relay unit 2, the second refrigerant flow switching devices 28a and 28b are switched to a "heating side," the opening/closing device 27 is closed, and the opening/closing device 29 is opened. Switching the second refrigerant flow switching devices 28a and 28b to the "heating side" means switching the second refrigerant flow switching devices 28a and 28b such that the refrigerant flows from the side of the second refrigerant flow switching devices 28a and 28b toward the side of the intermediate heat exchangers 25a and 25b.

In the relay unit 2 on the part of the heat medium circuit B, the pump 31a and the pump 31b are activated, and the second heat medium flow switching devices 32a to 32d and the first heat medium flow switching devices 33a to 33d are each in State (1) or State (2) described above, whereby associated passages are opened. Hence, the heat medium circulates between the intermediate heat exchanger 25a and the use-side heat exchangers 35c and 35d and between the intermediate heat exchanger 25b and the use-side heat exchangers 35a and 35b.

While the above description concerns an exemplary case where the heat medium circulates "between the intermediate heat exchanger 25a and the use-side heat exchangers 35c and 35d" and the heat medium circulates "between the intermediate heat exchanger 25b and the use-side heat exchangers 35a and 35b," the passages of the first heat medium flow switching devices 33 and the second heat medium flow switching devices 32 may be adjusted such that, for example, the heat medium circulates "between the intermediate heat exchanger 25a and the use-side heat exchangers 35a and 35b" and the heat medium circulates "between the intermediate heat exchanger 25b and the use-side heat exchangers 35c and 35d."

While the above description concerns an exemplary case where one intermediate heat exchanger 25 is connected to two use-side heat exchangers 35, the present invention is not limited to such a case. For example, if the load generated by the indoor unit 3a is high, the intermediate heat exchanger 25a may be connected to the use-side heat exchanger 35a (one use-side heat exchanger 35) while the intermediate heat exchanger 25b may be connected to the use-side heat exchangers 35b to 35d (three use-side heat exchangers 35).

[Cooling Main Operation Mode]

Figure 9:
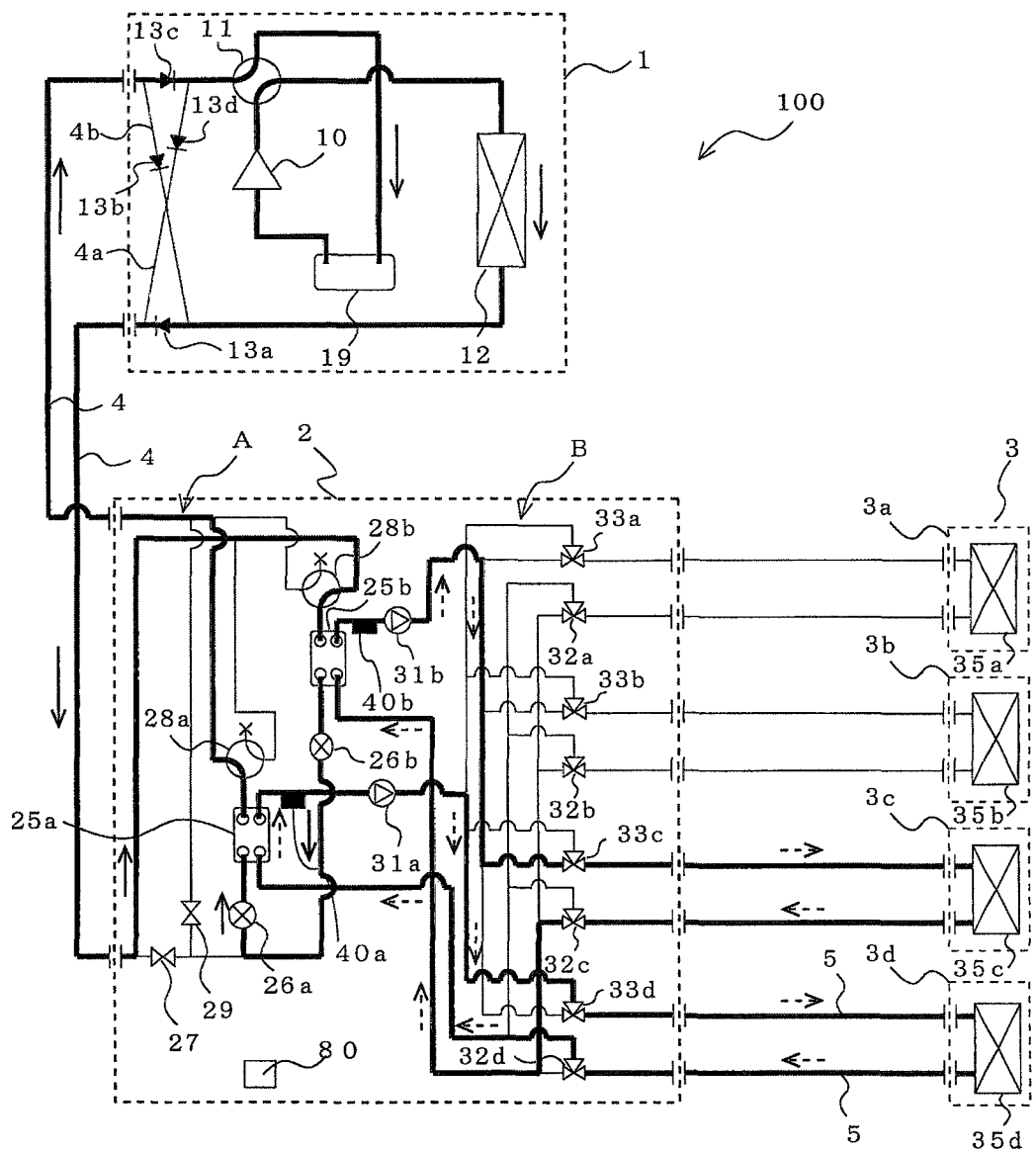
FIG. 9 is a refrigerant circuit diagram illustrating the flows of the refrigerants when the air-conditioning apparatus illustrated in FIG. 2 is in a cooling main operation mode.

FIG. 9 is a refrigerant circuit diagram illustrating the flows of the refrigerants when the air-conditioning apparatus 100 illustrated in FIG. 2 is in the cooling main operation mode. FIG. 9 illustrates an exemplary case of the cooling main operation mode where the use-side heat exchanger 35c has a heating energy load while the use-side heat exchanger 35d has a cooling energy load. Referring to FIG. 9, pipes indicated by bold lines correspond to pipes in which the refrigerants (the heat-source-side refrigerant and the heat medium) flow. Referring again to FIG. 9, the direction in which the heat-source-side refrigerant flows is represented by solid arrows, and the direction in which the heat medium flows is represented by dashed arrows.

In the cooling main operation mode illustrated in FIG. 9, the following process is performed. In the outdoor unit 1 on the part of the refrigerant circuit A, the first refrigerant flow switching device 11 is switched such that the heat-source-side refrigerant discharged from the compressor 10 flows into the heat-source-side heat exchanger 12.

In the relay unit 2, the second refrigerant flow switching device 28a is switched to the cooling side, the second refrigerant flow switching device 28b is switched to the heating side, and the opening/closing device 27 and the opening/closing device 29 are closed.

In the relay unit 2 on the part of the heat medium circuit B, the pump 31a and the pump 31b are activated, and the second heat medium flow switching devices 32a and 32b and the first heat medium flow switching devices 33a and 33b are fully closed (see FIG. 5). Furthermore, the second heat medium flow switching devices 32c and 32d and the first heat medium flow switching devices 33c and 33d are each in State (1) or State (2) described above, whereby associated passages are opened. Hence, the heat medium circulates between the intermediate heat exchanger 25a and the use-side heat exchanger 35d and between the intermediate heat exchanger 25b and the use-side heat exchanger 35c.

[Heating Main Operation Mode]

Figure 10:
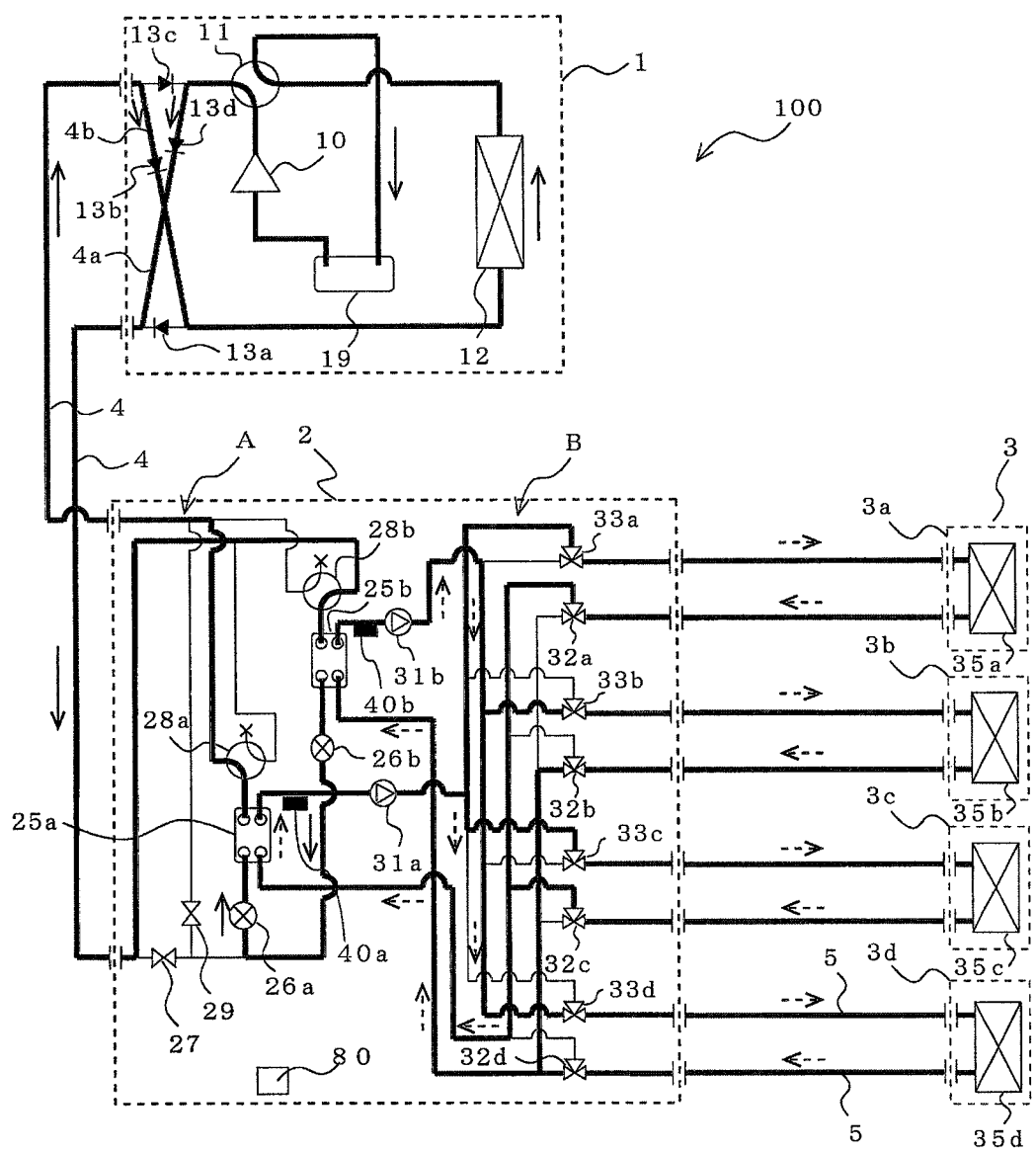
FIG. 10 is a refrigerant circuit diagram illustrating the flows of the refrigerants when the air-conditioning apparatus illustrated in FIG. 2 is in a heating main operation mode.

FIG. 10 is a refrigerant circuit diagram illustrating the flows of the refrigerants when the air-conditioning apparatus 100 illustrated in FIG. 2 is in the heating main operation mode. FIG. 10 illustrates an exemplary case of the heating main operation mode where the use-side heat exchangers 35b and 35d have heating energy loads while the use-side heat exchangers 35a and 35c have cooling energy loads. Referring to FIG. 10, pipes indicated by bold lines correspond to pipes in which the refrigerants (the heat-source-side refrigerant and the heat medium) flow. Referring again to FIG. 10, the direction in which the heat-source-side refrigerant flows is represented by solid arrows, and the direction in which the heat medium flows is represented by dashed arrows.

In the heating main operation mode illustrated in FIG. 10, the following process is performed. In the outdoor unit 1 on the part of the refrigerant circuit A, the first refrigerant flow switching device 11 is switched such that the heat-source-side refrigerant discharged from the compressor 10 flows out of the outdoor unit 1 via the check valve 13d.

In the relay unit 2, the second refrigerant flow switching device 28a is switched to the cooling side, the second refrigerant flow switching device 28b is switched to the heating side, and the opening/closing device 27 and the opening/closing device 29 are closed.

In the relay unit 2 on the part of the heat medium circuit B, the pump 31a and the pump 31b are activated, and the second heat medium flow switching devices 32a to 32d and the first heat medium flow switching devices 33a to 33d are each in State (1) or State (2) described above, whereby associated passages are opened. Hence, the heat medium circulates between the intermediate heat exchanger 25a and the use-side heat exchangers 35a and 35c and between the intermediate heat exchanger 25b and the use-side heat exchangers 35b and 35d.

[Advantageous Effects Produced by Air-Conditioning Apparatus 100 According to Embodiment]

In the air-conditioning apparatus 100 according to Embodiment, the first heat medium flow switching devices 33 and the second heat medium flow switching devices 32 each include the casing D and the valve body E, and the casing D and the valve body E are used for flow control. Hence, there is no need to separately provide heat medium flow control devices between each of the first heat medium flow switching devices 33 and a corresponding one of the use-side heat exchangers 35a to 35d or between each of the second heat medium flow switching devices 32 and a corresponding one of the use-side heat exchangers 35a to 35d. Accordingly, the number of components can be reduced.

Since the number of components that form the heat medium passages can be reduced, the pressure loss in the heat medium circuit B can be reduced correspondingly. Furthermore, since the number of components can be reduced, the cost increase can be reduced correspondingly. Moreover, since the number of components is reduced, the number of components to be maintained is reduced correspondingly. Consequently, the ease of maintenance increases.

In the air-conditioning apparatus 100 according to Embodiment, the heat medium is supplied to the indoor units 3. Therefore, leakage of the heat-source-side refrigerant in rooms or other expected places is prevented.

In the air-conditioning apparatus 100 according to Embodiment, the heat medium is transported not along the path from the outdoor unit to the indoor units but along the path from the relay unit 2 to the indoor units 3. Therefore, the power of transport exerted by the pumps 31a and 31b can be reduced. Consequently, the energy consumed by the pumps 31a and 31b can be reduced.

In the air-conditioning apparatus 100 according to Embodiment, the outdoor unit 1 and the indoor units 3 are connected via the relay unit 2. Hence, there is no need to connect individual components on the outdoor side to individual components on the indoor side by pipes, and the ease of construction work increases correspondingly.

In the air-conditioning apparatus 100 according to Embodiment, the intermediate heat exchangers 25a and 25b connected to the outdoor unit 1 are connected in parallel with each other. Therefore, in the cooling only operation mode and in the heating only operation mode, the heat-source-side refrigerant that has undergone heat exchange in one of the intermediate heat exchangers 25a and 25b does not flow into and undergo heat exchange in the other intermediate heat exchanger 25b or 25a. Consequently, the capacity of each of the indoor units can be maximized.

In the air-conditioning apparatus 100 according to Embodiment, the heat medium is transported by the pumps 31a and 31b included in the relay unit 2. Hence, there is no need to provide a pump for each of the indoor units 3. Consequently, the cost increase can be reduced correspondingly.

In the air-conditioning apparatus 100 according to Embodiment, the pumps 31a and 31b are included in the relay unit 2. Hence, leakage of noise generated by the pumps 31a and 31b to the side of the indoor units 3 is suppressed. Consequently, the comfort for users increases.

The invention claimed is:

1. An air-conditioning apparatus comprising:
a refrigerant circuit including a compressor, a first refrigerant flow switching device, refrigerant passage of a plurality of intermediate heat exchangers, a first expansion device, and a heat-source-side heat exchanger;
a heat medium circuit including heat medium passage of the plurality of intermediate heat exchangers, a pump, and a plurality of use-side heat exchangers;
first heat medium flow switching devices provided in the heat medium circuit, the first heat medium flow switching devices being configured to switch a passage of a heat medium supplied from the plurality of intermediate heat exchangers to respective use-side heat exchangers; and
second heat medium flow switching devices provided in the heat medium circuit, the second heat medium flow switching devices being configured to switch a passage of the heat medium returning from the respective use-side heat exchangers to the plurality of intermediate heat exchangers,
wherein the first heat medium flow switching devices and the second heat medium flow switching devices each include:
a first passage pipe connected to one of the plurality of intermediate heat exchangers;
a second passage pipe connected to another of the plurality of intermediate heat exchangers;
a third passage pipe connected to a corresponding one of the use-side heat exchangers, the third passage pipe including a first portion through which the first passage pipe connects to the third passage pipe and a second portion through which the second passage pipe connects to the third passage pipe, the first portion and the second portion opposing each other; and
a valve body provided in the third passage pipe and including an open portion, the valve body being configured to selectively form
a first path in which the first passage pipe is fluidly connected to the third passage pipe via the open portion, and
a second path in which the second passage pipe is fluidly connected to the third passage pipe via the open portion
by rotating about an axis extending in a direction in which the heat medium flows through the third passage pipe,
wherein:
the open portion of the valve body includes a first edge, a second edge, a third edge, and a fourth edge;
the first edge and the second edge are parallel to a first direction parallel to the axis of the valve body; and
the third edge and the fourth edge are parallel to a second direction perpendicular to the axis of the valve body, and
wherein:
a length from a connection between the first passage pipe and the third passage pipe to a connection between the second passage pipe and the third passage pipe is defined as a casing passage width;
a first length between the first edge and the third edge in the second direction is defined as a first opening width;
a second length between the third edge and the fourth edge in the first direction is defined as a second opening width;
the first opening width is smaller than the casing passage width;
the first opening width is constant from the third edge to the fourth edge; and
the second opening width is constant from the first edge to the second edge.

2. The air-conditioning apparatus of claim 1, further comprising:
a heating only operation mode in which each of the plurality of intermediate heat exchangers serves as a condenser;
a cooling only operation mode in which each of the plurality of intermediate heat exchangers serves as an evaporator; and
a cooling and heating mixed operation mode in which one of the plurality of intermediate heat exchangers serves as a condenser while another of the plurality of intermediate heat exchangers serves as an evaporator,
wherein a rate of the heat medium that is allowed to flow into each of the use-side heat exchangers is adjustable in accordance with a position of rotation of the open portion of a corresponding one of the valve bodies.

3. The air-conditioning apparatus of claim 1,
wherein the first heat medium flow switching devices and the second heat medium flow switching devices each include:
a shaft portion connected to the valve body; and
a valve body driver connected to the shaft portion of the valve body and configured to rotate the shaft portion.

4. The air-conditioning apparatus of claim 3,
wherein the valve body driver is connected to
the shaft portion of the valve body of a corresponding one of the first heat medium flow switching devices, and
the shaft portion of the valve body of a corresponding one of the second heat medium flow switching devices that is connected to the use-side heat exchanger to which the corresponding one of the first heat medium flow switching devices is connected.

5. The air-conditioning apparatus of claim 4, further comprising,
a controller configured to control a rotate angle of the valve body about the axis to drive the valve body drivers of the first heat medium flow switching devices and the second heat medium flow switching devices,
wherein the controller controls the valve body drivers
to be a first rotate angle in which a state of communication between the first passage pipe and the third passage pipe is maximized or
to be a second rotate angle in which a state of communication between the second passage pipe and the third passage pipe is maximized.

6. A flow switching device comprising:

a first passage pipe and a second passage pipe;

a third passage pipe including a first portion through which the first passage pipe connects to the third passage pipe and a second portion through which the second passage pipe connects to the third passage pipe, the first portion and the second portion opposing each other;

a first valve body provided in the third passage pipe and including a first open portion, the first valve body being configured to selectively form
- a first path in which the first passage pipe is fluidly connected to the third passage pipe via the first open portion, and
- a second path in which the second passage pipe is fluidly connected to the third passage pipe via the first open portion by rotating about an axis extending in a direction in which a heat medium flows through the third passage pipe;

a first shaft portion connected to the first valve body;

a fourth passage pipe and a fifth passage pipe;

a sixth passage pipe including a third portion to which the fourth passage pipe is connected and fourth portion to which the fifth passage pipe is connected, the fourth portion and the fifth portion opposing each other;

a second valve body provided in the sixth passage pipe and including a second open portion, the second valve body being configured to selectively form
- a third path in which the fourth passage pipe is fluidly connected to the sixth passage pipe via the second open portion, and
- a fourth path in which the fifth passage pipe is fluidly connected to the sixth passage pipe via the second open portion by rotating about the axis;

a second shaft portion connected to the second valve body; and a valve body driver connected to the first shaft portion and the second shaft portion, the valve body driver being configured to rotate the first shaft portion and the second shaft portion, wherein:
- the first open portion of the first valve body include a first edge and a second edge, a third edge and a fourth edge;
- the first edge and the second edge are parallel to a first direction parallel to the axis of the first valve body; and
- the third edge and the fourth edge are parallel to a second direction perpendicular to the axis of the first valve body, wherein:
- a length from a connection between the first passage pipe and the third passage pipe to a connection between the second passage pipe and the third passage pipe is defined as a first casing passage width;
- a first length between the first edge and the third edge in the second direction is defined as a first opening width;
- a second length between the third edge and the fourth edge in the first direction is defined as a second opening width;
- the first opening width is smaller than the first casing passage width;
- the first opening width is constant from the third edge to the fourth edge; and
- the second opening width is constant from the first edge to the second edge, wherein:
- the second open portion of the second valve body includes a fifth edge, a sixth edge, a seventh edge and a eighth edge;
- the fifth edge and the sixth edge are parallel to a third direction parallel to the axis of the second valve body; and
- the seventh edge and the eighth edge are parallel to a fourth direction perpendicular to the axis of the second valve body, and wherein:
- a length from a connection between the fourth passage pipe and the sixth passage pipe to a connection between the fifth passage pipe and the sixth passage pipe is defined as a second casing passage width;
- a third length between the fifth edge and the sixth edge in the fourth direction is defined as a third opening width;
- a fourth length of the second portion between the seventh edge and the eight edge in the third direction is defined as a fourth opening width;
- the third opening width is smaller than the second casing passage width;
- the third opening width is constant from the seventh edge to the eighth edge; and
- the fourth opening width is constant from the fifth edge to the sixth edge.

* * * * *